United States Patent
Thompson

(10) Patent No.: US 10,821,668 B2
(45) Date of Patent: Nov. 3, 2020

(54) METHOD FOR PRODUCING A COMPONENT LAYER-BY-LAYER

(71) Applicant: General Electric Company, Schenectady, NY (US)

(72) Inventor: Mary Kathryn Thompson, North Huntingdon, PA (US)

(73) Assignee: General Electric Company, Schenectady, NY (US)

( * ) Notice: Subject to any disclaimer, the term of this patent is extended or adjusted under 35 U.S.C. 154(b) by 270 days.

(21) Appl. No.: 15/880,781

(22) Filed: Jan. 26, 2018

(65) Prior Publication Data

US 2019/0232559 A1 Aug. 1, 2019

(51) Int. Cl.
  *B33Y 40/00* (2020.01)
  *B29C 64/255* (2017.01)
  (Continued)

(52) U.S. Cl.
  CPC .......... *B29C 64/255* (2017.08); *B29C 64/124* (2017.08); *B29C 64/129* (2017.08);
  (Continued)

(58) Field of Classification Search
  CPC .......... B29C 2033/0005; B29C 64/124; B29C 64/129; B29C 64/135; B29C 64/35; B33Y 10/00; B33Y 40/00
  (Continued)

(56) References Cited

U.S. PATENT DOCUMENTS 4,575,330 A 3/1986 Hull
4,752,498 A 6/1988 Fudim
(Continued)

FOREIGN PATENT DOCUMENTS

EP 2505341 10/2012
JP 61114817 6/1986
(Continued)

OTHER PUBLICATIONS

Nussbaum et al., Evaluation of Processing Variables in Large Area Polymer Sintering of Single Layer Components, Solid Freeform Fabrication 2016: Proceedings of the 27th Annual International Solid Freeform Fabracation Symposium—An Additive Manufacturing Conference Reviewed Paper, University of South Florida, Tampa, Florida, US.
(Continued)

*Primary Examiner* — Leo B Tentoni
(74) *Attorney, Agent, or Firm* — General Electric; Brian Overbeck

(57) ABSTRACT

An additive manufacturing apparatus that includes a vat configured to receive a radiant-energy-curable resin and a method for using the vat. A floor defines at least a first portion and a sump wherein the first portion is above the sump. The first portion defines a build surface, at least some of which is transparent. A stage is positioned facing the build surface and is configured to hold a stacked arrangement of one or more cured layers of the radiant-energy-curable resin. One or more actuators are operable to change the relative positions of the vat and the stage. A radiant energy apparatus is positioned adjacent to the vat opposite to the stage and is operable to generate and project radiant energy on the radiant-energy-curable resin through the floor of the vat in a predetermined pattern. The additive manufacturing apparatus also includes a cleaning apparatus operable to transfer debris from the build surface to the sump.

5 Claims, 18 Drawing Sheets

(51) Int. Cl.
*B29C 64/135* (2017.01)
*B33Y 30/00* (2015.01)
*B33Y 10/00* (2015.01)
*B29C 64/35* (2017.01)
*B29C 64/129* (2017.01)
*B29C 64/124* (2017.01)
*B29C 33/00* (2006.01)

(52) U.S. Cl.
CPC ............ *B29C 64/135* (2017.08); *B29C 64/35* (2017.08); *B33Y 10/00* (2014.12); *B33Y 30/00* (2014.12); *B29C 2033/0005* (2013.01)

(58) Field of Classification Search
USPC ........................................ 264/232, 238, 401
See application file for complete search history.

(56) References Cited

U.S. PATENT DOCUMENTS

| | | |
|---|---|---|
| 5,026,146 A | 6/1991 | Hug et al. |
| 5,031,120 A | 7/1991 | Pomerantz et al. |
| 5,088,047 A | 2/1992 | Bynum |
| 5,096,530 A | 3/1992 | Cohen |
| 5,104,592 A | 4/1992 | Hull et al. |
| 5,126,529 A | 6/1992 | Weiss et al. |
| 5,143,663 A | 9/1992 | Leyden et al. |
| 5,171,490 A | 12/1992 | Fudim |
| 5,174,931 A | 12/1992 | Almquist et al. |
| 5,182,055 A | 1/1993 | Allison et al. |
| 5,192,559 A | 3/1993 | Hull et al. |
| 5,203,944 A | 4/1993 | Prinz et al. |
| 5,204,055 A | 4/1993 | Sachs et al. |
| 5,207,371 A | 5/1993 | Prinz et al. |
| 5,258,146 A | 11/1993 | Almquist et al. |
| 5,340,656 A | 8/1994 | Sachs et al. |
| 5,352,405 A | 10/1994 | Beaman et al. |
| 5,387,380 A | 2/1995 | Cima et al. |
| 5,432,045 A | 7/1995 | Narukawa et al. |
| 5,447,822 A | 9/1995 | Hull et al. |
| 5,454,069 A | 9/1995 | Knapp et al. |
| 5,496,682 A | 3/1996 | Quadir et al. |
| 5,573,721 A | 11/1996 | Gillette |
| 5,626,919 A | 5/1997 | Chapman et al. |
| 5,650,260 A | 7/1997 | Onishi |
| 5,660,621 A | 8/1997 | Bredt |
| 5,665,401 A | 9/1997 | Serbin et al. |
| 5,697,043 A | 12/1997 | Baskaran et al. |
| 5,718,279 A | 2/1998 | Saoth et al. |
| 5,807,437 A | 9/1998 | Sachs et al. |
| 5,851,465 A | 12/1998 | Bredt |
| 5,874,041 A * | 2/1999 | Matsumura ....... C08F 222/1006 264/401 |
| 5,940,674 A | 8/1999 | Sachs et al. |
| 5,985,204 A | 11/1999 | Otsuka et al. |
| 6,051,179 A | 4/2000 | Hagenau |
| 6,146,567 A | 11/2000 | Sachs et al. |
| 6,193,923 B1 | 2/2001 | Leyden et al. |
| 6,200,646 B1 | 3/2001 | Neckers et al. |
| 6,206,672 B1 | 3/2001 | Grenda |
| 6,363,606 B1 | 4/2002 | Johnson et al. |
| 6,376,148 B1 | 4/2002 | Liu et al. |
| 6,401,002 B1 | 6/2002 | Jang et al. |
| 6,403,002 B1 | 6/2002 | van der Geest |
| 6,436,520 B1 | 8/2002 | Yamamoto |
| 6,471,800 B2 | 10/2002 | Jang et al. |
| 6,500,378 B1 | 12/2002 | Smith |
| 6,596,224 B1 | 7/2003 | Sachs et al. |
| 6,780,368 B2 | 8/2004 | Liu et al. |
| 6,838,035 B1 | 1/2005 | Ederer et al. |
| 6,850,334 B1 | 2/2005 | Gothait |
| 6,896,839 B2 | 5/2005 | Kubo et al. |
| 6,930,144 B2 | 8/2005 | Oriakhi |
| 6,966,960 B2 | 11/2005 | Boyd et al. |
| 6,986,654 B2 | 1/2006 | Imiolek et al. |
| 7,008,209 B2 | 3/2006 | Iskra et al. |
| 7,034,246 B2 | 4/2006 | Muylaert et al. |
| 7,052,263 B2 | 5/2006 | John |
| 7,087,109 B2 | 8/2006 | Bredr et al. |
| 7,195,472 B2 | 3/2007 | John |
| 7,270,528 B2 | 9/2007 | Sherwood |
| 7,300,613 B2 | 11/2007 | Sane et al. |
| 7,455,804 B2 | 11/2008 | Patel et al. |
| 7,520,740 B2 | 4/2009 | Wahlstrom et al. |
| 7,550,518 B2 | 6/2009 | Bredt et al. |
| 7,578,958 B2 | 8/2009 | Patel et al. |
| 7,614,866 B2 | 11/2009 | Sperry et al. |
| 7,636,610 B2 | 12/2009 | Schillen et al. |
| 7,767,132 B2 | 8/2010 | Patel et al. |
| 7,783,371 B2 | 8/2010 | John et al. |
| 7,785,093 B2 | 8/2010 | Holmboe et al. |
| 7,790,093 B2 | 9/2010 | Shkolnik et al. |
| 7,795,349 B2 | 9/2010 | Bredt et al. |
| 7,815,826 B2 | 10/2010 | Serdy et al. |
| 7,867,302 B2 | 1/2011 | Nevoret et al. |
| 7,892,474 B2 | 2/2011 | Shkolnik et al. |
| 7,894,921 B2 | 2/2011 | John et al. |
| 7,896,639 B2 | 3/2011 | Kritchman et al. |
| 7,946,840 B2 | 5/2011 | Perret et al. |
| 7,959,847 B2 | 6/2011 | Wicker et al. |
| 8,003,040 B2 | 8/2011 | El-Siblani |
| 8,071,055 B2 | 9/2011 | Davidson et al. |
| 8,110,135 B2 | 2/2012 | El-Siblani |
| 8,126,580 B2 | 2/2012 | El-Siblani et al. |
| 81,579,008 | 4/2012 | Williams |
| 8,185,229 B2 | 5/2012 | Davidson |
| 8,096,262 B2 | 6/2012 | Ederer et al. |
| 8,211,226 B2 | 7/2012 | Bredt et al. |
| 8,326,024 B2 | 12/2012 | Shkolnik et al. |
| 8,444,903 B2 | 5/2013 | Lyons et al. |
| 8,475,946 B1 | 7/2013 | Dion et al. |
| 8,506,862 B2 | 8/2013 | Giller et al. |
| 8,506,870 B2 | 8/2013 | Hochsmann et al. |
| 8,568,649 B1 | 10/2013 | Balistreri et al. |
| 8,616,872 B2 | 12/2013 | Matsui et al. |
| 8,623,264 B2 | 1/2014 | Rohner et al. |
| 8,636,494 B2 | 1/2014 | Gothait et al. |
| 8,636,496 B2 | 1/2014 | Das et al. |
| 8,666,142 B2 | 3/2014 | Shkolnik et al. |
| 8,715,832 B2 | 5/2014 | Ederer et al. |
| 8,741,194 B1 | 6/2014 | Ederer et al. |
| 8,741,203 B2 | 6/2014 | Liska et al. |
| 8,761,918 B2 | 6/2014 | Silverbrook |
| 8,801,418 B2 | 8/2014 | El-Siblani et al. |
| 8,815,143 B2 | 8/2014 | John et al. |
| 8,844,133 B2 | 8/2014 | Fuller |
| 8,845,316 B2 | 9/2014 | Schillen et al. |
| 8,845,953 B1 | 9/2014 | Balistreri et al. |
| 8,876,513 B2 | 11/2014 | Lim et al. |
| 8,915,728 B2 | 12/2014 | Mironets et al. |
| 8,926,304 B1 | 1/2015 | Chen |
| 8,926,879 B2 | 1/2015 | Vagt et al. |
| 8,932,511 B2 | 1/2015 | Napendensky |
| 8,968,625 B2 | 3/2015 | Tan |
| 8,991,211 B1 | 3/2015 | Arlotti et al. |
| 8,998,601 B2 | 4/2015 | Busato |
| 9,067,359 B2 | 6/2015 | Rohner et al. |
| 9,079,357 B2 | 7/2015 | Ebert et al. |
| 9,101,321 B1 | 8/2015 | Kiesser |
| 9,120,270 B2 | 9/2015 | Chen et al. |
| 9,149,989 B2 | 10/2015 | Uckelmann |
| 9,205,601 B2 | 12/2015 | DeSimone et al. |
| 9,211,678 B2 | 12/2015 | DeSimone et al. |
| 9,216,546 B2 | 12/2015 | DeSimone et al. |
| 9,233,504 B2 | 1/2016 | Douglas et al. |
| 9,248,600 B2 | 2/2016 | Goodman et al. |
| 9,259,880 B2 | 2/2016 | Chen |
| 9,327,385 B2 | 5/2016 | Webb et al. |
| 9,360,757 B2 | 6/2016 | DeSimone et al. |
| 9,364,848 B2 | 6/2016 | Silverbrook |
| 9,403,322 B2 | 8/2016 | Das et al. |
| 9,403,324 B2 | 8/2016 | Ederer et al. |
| 9,415,544 B2 | 8/2016 | Kerekes et al. |
| 9,429,104 B2 | 8/2016 | Fuller |

(56) References Cited

U.S. PATENT DOCUMENTS

| | | |
|---|---|---|
| 9,434,107 B2 | 9/2016 | Zenere |
| 9,453,142 B2 | 9/2016 | Rolland et al. |
| 9,456,884 B2 | 10/2016 | Ucelmann et al. |
| 9,463,488 B2 | 10/2016 | Ederer et al. |
| 9,469,074 B2 | 10/2016 | Ederer et al. |
| 9,487,443 B2 | 11/2016 | Watanabe |
| 9,498,920 B2 | 11/2016 | DeSimone et al. |
| 9,511,546 B2 | 12/2016 | Chen et al. |
| 9,517,591 B2 | 12/2016 | Yoo et al. |
| 9,517,592 B2 | 12/2016 | Yoo et al. |
| 9,527,244 B2 | 12/2016 | El-Siblani |
| 9,529,371 B2 | 12/2016 | Nakamura |
| 9,533,450 B2 | 1/2017 | El-Siblani et al. |
| 9,539,762 B2 | 1/2017 | Durand et al. |
| 9,545,753 B2 | 1/2017 | Costabeber |
| 9,555,584 B2 | 1/2017 | Costabeber |
| 9,561,622 B2 | 2/2017 | Das et al. |
| 9,561,623 B2 | 2/2017 | El-Siblani et al. |
| 9,578,695 B2 | 2/2017 | Jerby et al. |
| 9,579,852 B2 | 2/2017 | Okamoto |
| 9,592,635 B2 | 3/2017 | Ebert et al. |
| 9,604,411 B2 | 3/2017 | Rogren |
| 9,632,420 B2 | 4/2017 | Allanic |
| 9,632,983 B2 | 4/2017 | Ueda et al. |
| 9,636,873 B2 | 5/2017 | Joyce |
| 9,649,812 B2 | 5/2017 | Hartmann et al. |
| 9,649,815 B2 | 5/2017 | Atwood et al. |
| 9,670,371 B2 | 6/2017 | Pervan et al. |
| 9,676,143 B2 | 6/2017 | Kashani-Shirazi |
| 9,676,963 B2 | 6/2017 | Rolland et al. |
| 9,682,166 B2 | 6/2017 | Watanabe |
| 9,682,425 B2 | 6/2017 | Xu et al. |
| 2008/0170112 A1 | 7/2008 | Hull et al. |
| 2010/0003619 A1 | 1/2010 | Das et al. |
| 2012/0195994 A1 | 8/2012 | El-Siblani et al. |
| 2014/0084517 A1 | 3/2014 | Sperry et al. |
| 2014/0103581 A1 | 4/2014 | Das et al. |
| 2014/0275317 A1 | 9/2014 | Moussa |
| 2014/0319735 A1 | 10/2014 | El-Siblani et al. |
| 2014/0322374 A1 | 10/2014 | El-Siblani et al. |
| 2015/0102531 A1 | 4/2015 | El-Siblani et al. |
| 2015/0140152 A1 | 5/2015 | Chen |
| 2015/0145174 A1 | 5/2015 | Comb |
| 2015/0165695 A1 | 6/2015 | Chen et al. |
| 2015/0183168 A1 | 7/2015 | Liverman et al. |
| 2015/0210012 A1 | 7/2015 | Zenere |
| 2015/0224710 A1 | 8/2015 | El-Siblani |
| 2015/0246487 A1 | 9/2015 | El-Siblani |
| 2015/0355553 A1 | 12/2015 | Allanic |
| 2016/0031010 A1 | 2/2016 | O'Neill et al. |
| 2016/0046075 A1 | 2/2016 | DeSimone et al. |
| 2016/0059485 A1 | 3/2016 | Ding et al. |
| 2016/0096332 A1 | 4/2016 | Chen et al. |
| 2016/0107387 A1 | 4/2016 | Ooba et al. |
| 2016/0129631 A1 | 5/2016 | Chen et al. |
| 2016/0166359 A1 | 6/2016 | Flach et al. |
| 2016/0193785 A1 | 7/2016 | Bell et al. |
| 2016/0214327 A1 | 7/2016 | Uckelmann et al. |
| 2016/0221262 A1 | 8/2016 | Das et al. |
| 2016/0297141 A1 | 10/2016 | El-Siblani et al. |
| 2016/0332386 A1 | 11/2016 | Kuijpers |
| 2016/0361872 A1 | 12/2016 | El-Siblani |
| 2017/0001377 A1 | 1/2017 | Meisner et al. |
| 2017/0008234 A1 | 1/2017 | Cullen et al. |
| 2017/0008236 A1 | 1/2017 | Easter et al. |
| 2017/0057177 A1 | 3/2017 | Ferguson et al. |
| 2017/0057178 A1 | 3/2017 | FrantzDale et al. |
| 2017/0066196 A1 | 3/2017 | Beard et al. |
| 2017/0072635 A1 | 3/2017 | El-Siblani et al. |
| 2017/0100891 A1 | 4/2017 | Meisner et al. |
| 2017/0100893 A1 | 4/2017 | Meisner et al. |
| 2017/0100895 A1 | 4/2017 | Chou et al. |
| 2017/0100897 A1 | 4/2017 | Chou et al. |
| 2017/0100899 A1 | 4/2017 | El-Siblani |
| 2017/0102679 A1 | 4/2017 | Greene et al. |
| 2017/0113409 A1 | 4/2017 | Patrov |
| 2017/0120332 A1 | 5/2017 | DeMuth et al. |
| 2017/0120333 A1 | 5/2017 | DeMuth et al. |
| 2017/0120334 A1 | 5/2017 | DeMuth et al. |
| 2017/0120335 A1 | 5/2017 | DeMuth et al. |
| 2017/0120336 A1 | 5/2017 | DeMuth et al. |
| 2017/0120387 A1 | 5/2017 | DeMuth et al. |
| 2017/0120518 A1 | 5/2017 | DeMuth et al. |
| 2017/0120529 A1 | 5/2017 | DeMuth et al. |
| 2017/0120530 A1 | 5/2017 | DeMuth et al. |
| 2017/0120537 A1 | 5/2017 | DeMuth et al. |
| 2017/0120538 A1 | 5/2017 | DeMuth et al. |
| 2017/0123222 A1 | 5/2017 | DeMuth et al. |
| 2017/0123237 A1 | 5/2017 | DeMuth et al. |
| 2017/0136688 A1 | 5/2017 | Knecht et al. |
| 2017/0136708 A1 | 5/2017 | Das et al. |
| 2017/0165916 A1 | 6/2017 | El Siblani |
| 2017/0173865 A1 | 6/2017 | Dikovsky et al. |
| 2017/0182708 A1 | 6/2017 | Lin et al. |
| 2017/0190120 A1 | 7/2017 | Bloome et al. |
| 2017/0197363 A1 | 7/2017 | FrantzDale |
| 2017/0266876 A1 | 9/2017 | Hocker |
| 2017/0266880 A1 | 9/2017 | Matsubara |
| 2017/0266890 A1 | 9/2017 | Volk |
| 2017/0297108 A1 | 10/2017 | Gibson et al. |
| 2017/0297109 A1 | 10/2017 | Gibson et al. |

FOREIGN PATENT DOCUMENTS

| | | |
|---|---|---|
| JP | 61114818 | 6/1986 |
| JP | 61116322 | 6/1986 |
| JP | H0499203 | 3/1992 |
| WO | 9806560 | 2/1998 |
| WO | 2006077665 | 7/2006 |
| WO | 201045950 | 4/2010 |
| WO | 201709368 | 1/2017 |
| WO | 2017091913 | 6/2017 |

OTHER PUBLICATIONS

Matthews et al., Diode-Based Additive Manufacturing of Metals Using an Optically-Addressable Light Valve, Optic Express Research Article, May 10, 2017, vol. 25, No. 10, Lawrence Livermore National Laboratory, Livermore, California, US.

Lee et al., Large-Area Compatible Laser Sintering Schemes with a Spatially Extended Focused Beam, www.mdpi.com/journal/micromachines, Article May 11, 2017, Micromachines, Seoul University, Seoul, Korea.

* cited by examiner

METHOD FOR PRODUCING A COMPONENT LAYER-BY-LAYER

BACKGROUND OF THE INVENTION

This invention relates generally to additive manufacturing, and more particularly to methods for curable material handling in additive manufacturing.

Additive manufacturing is a process in which material is built up piece-by-piece, line-by-line, or layer-by-layer to form a component. Stereolithography is a type of additive manufacturing process which employs a vat of liquid radiant-energy curable photopolymer "resin" and a curing energy source such as a laser. Similarly, DLP 3D printing employs a two-dimensional image projector to build components one layer at a time. For each layer, the projector flashes a radiation image of the cross-section of the component on the surface of the liquid or through a transparent object which defines a constrained surface of the resin. Exposure to the radiation cures and solidifies the pattern in the resin and joins it to a previously-cured layer or to another build surface.

In curing the photopolymer resin, it is preferable to have a clean supply of material for each layer. Old resin may contain cured products such as supports that have broken off of the part or other external contamination. In a vat-based process, this contamination or the contaminated material can cure into the component, resulting in undesirable geometry, or otherwise disrupt the build process and damage the final part.

BRIEF DESCRIPTION OF THE INVENTION

At least one of these problems is addressed by an additive manufacturing method in which material is deposited and cured in a vat that is configured to separately retain contaminants and loose cured material.

According to one aspect of the technology described herein, an additive manufacturing apparatus that includes a vat configured to receive a radiant-energy-curable resin having a floor. The floor defines at least a first portion and a sump wherein the first portion is above the sump. The first portion defines a build surface, at least some of which is transparent. A stage is positioned facing the build surface and configured to hold a stacked arrangement of one or more cured layers of the radiant-energy-curable resin. One or more actuators are operable to change the relative positions of the vat and the stage. A radiant energy apparatus is positioned adjacent to the vat opposite to the stage and is operable to generate and project radiant energy on the radiant-energy-curable resin through the floor of the vat in a predetermined pattern. The additive manufacturing apparatus also includes a cleaning apparatus operable to transfer debris from the build surface to the sump.

According to another aspect of the technology described herein, there is provided a method for producing a component layer-by-layer. The method includes the steps of: depositing a radiant-energy-curable resin on a build surface of a vat which includes at least a portion which is transparent; defining a layer increment in the radiant-energy-curable resin; selectively curing the radiant-energy-curable resin while the vat is positioned in a build zone defined between the stage and a radiant energy apparatus, using an application of radiant energy, from the radiant energy apparatus, in a specific pattern so as to define the geometry of a cross-sectional layer of the component; moving the vat and the stage relatively apart so as to separate the component from the build surface; using a cleaning apparatus to remove debris that remains over the build surface and move it into a sump that is an integral portion of the vat; and repeating the steps of depositing, defining, curing, moving, and cleaning for a plurality of layers until the component is complete.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
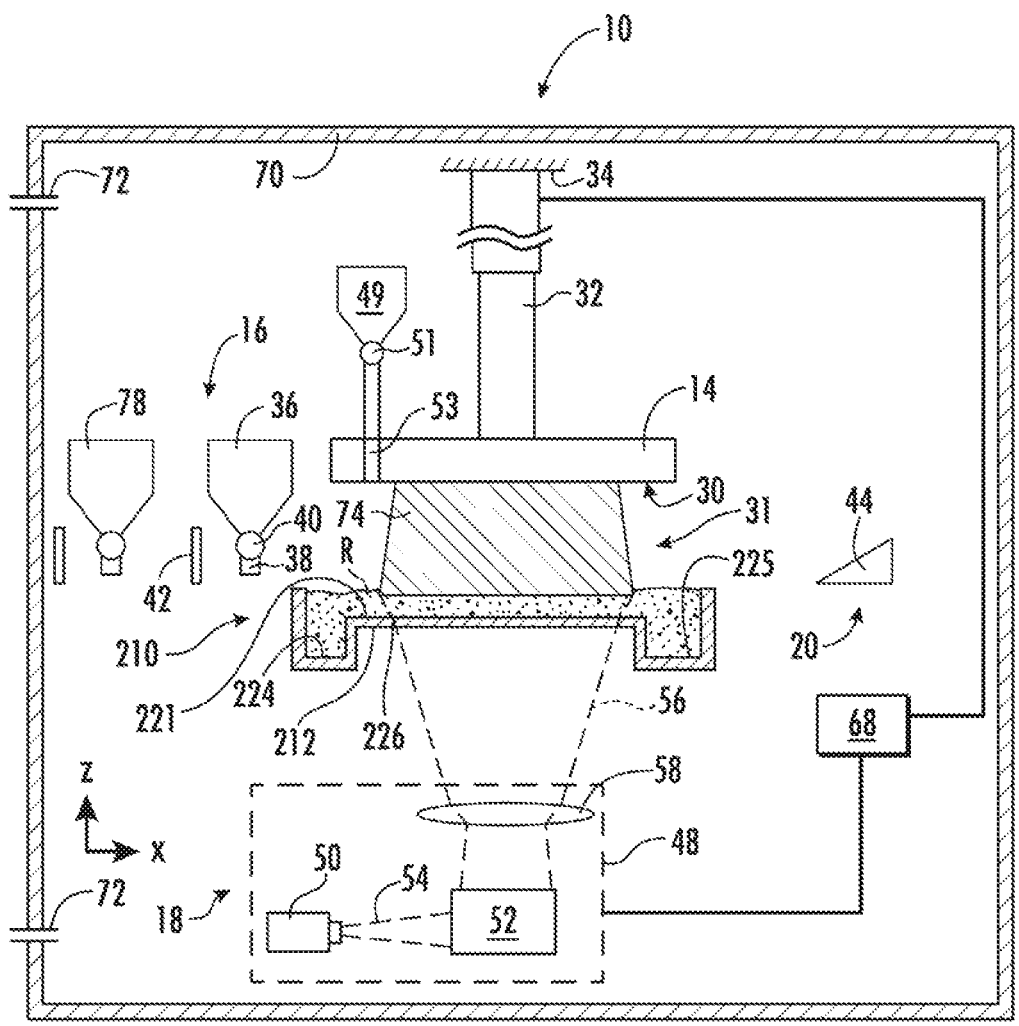
FIG. 1 is a schematic side elevation view of an exemplary additive manufacturing apparatus.

Referring to the drawings wherein identical reference numerals denote the same elements throughout the various views, FIG. 1 illustrates schematically an example of one type of suitable apparatus 10 for carrying out an additive manufacturing method for forming a component 74 from a resin R as described herein. As will be explained in more detail below, it will be understood that other configurations of equipment may be used to carry out the method described herein. The exemplary apparatus 10 includes a vat 210 that is configured to isolate debris that could contaminate the build from usable resin R. Other basic components are a stage 14, a material depositor 16, a radiant energy apparatus 18, and a cleaning apparatus 20. Each of these components will be described in more detail below.

Figure 9:
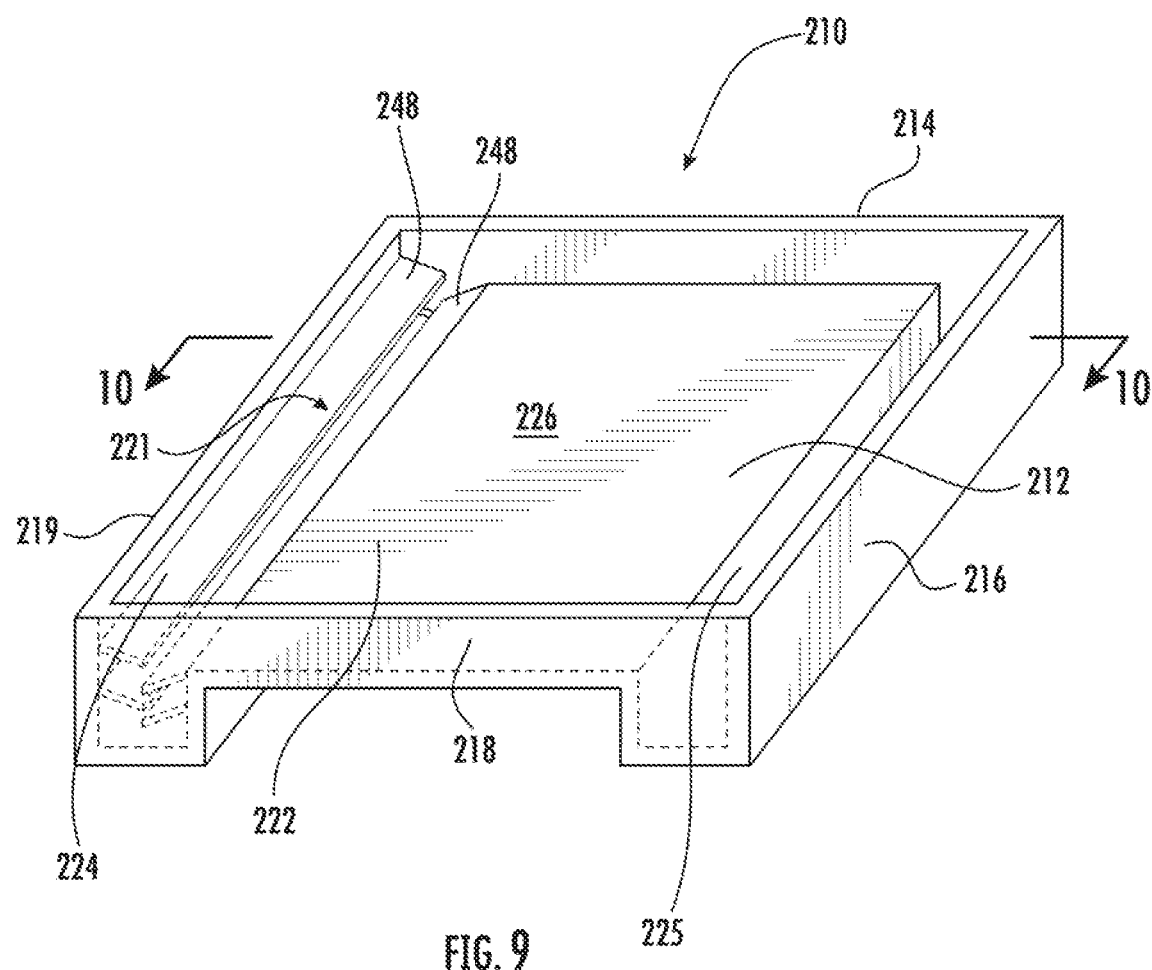
FIG. 9 is a view of a vat.
Figure 10:
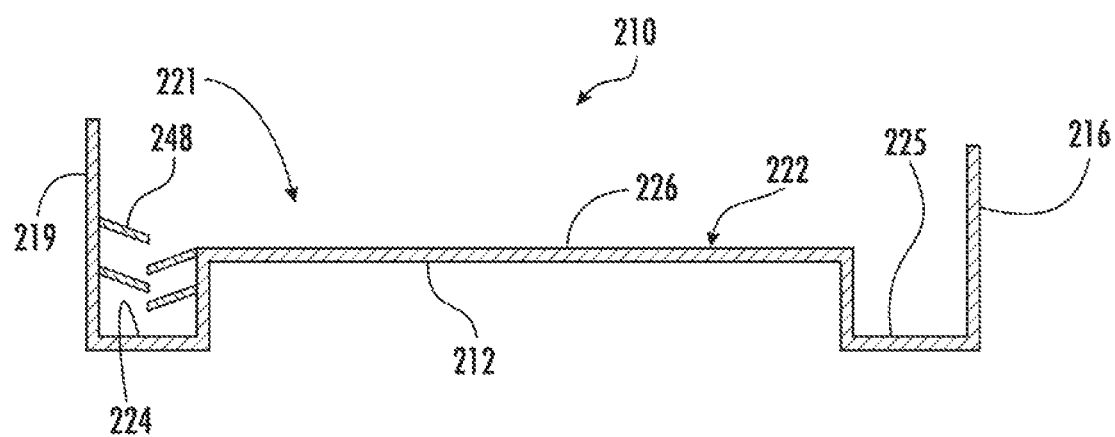
FIG. 10 is a sectional view of the vat of FIG. 9 taken along line 10-10.

Referring now to FIGS. 9 and 10, the vat 210 includes a floor 212 that extends between a first wall 214, a second wall 216, a third wall 218, and a fourth wall 219. Together, the floor 212 and the four walls 214, 216, 218, and 219 define a receptacle 221 for receiving the radiant-energy-curable resin. The receptacle 221 is open such that it can receive the stage 14 or a portion of the component 74.

The receptacle 221 includes three areas that can contain the resin R: a first portion 222 that is defined in part by a build surface 226; a first sump 224, and a second sump 225. The first sump 224 and the second sump 225 are positioned such that they are lower than the first portion 222. For purposes of convenient description, the build surface 226 may be considered to be oriented parallel to an X-Y plane of the apparatus 10, and a direction perpendicular to the X-Y plane is denoted as a Z-direction (X, Y, and Z being three mutually perpendicular directions).

As shown in FIG. 10, a plurality of baffles 248 are positioned in the first sump 224. The baffles 248 extend into the sump 224 and are positioned such that a distal end is closer to the floor than a basal end (which is attached to a wall). The baffles 248 are configured such that debris swept from the build surface 226 is directed into the sump and trapped in the sump 224.

The build surface 226 may be configured to be "nonstick", that is, resistant to adhesion of cured resin. The non-stick properties may be embodied by a combination of variables such as the chemistry of the floor 212, its surface finish, and/or applied coatings. In one example, a permanent or semi-permanent non-stick coating may be applied. One non-limiting example of a suitable coating is polytetrafluoroethylene ("PTFE"). In one example, all or a portion of the build surface 226 of vat 210 may incorporate a controlled roughness or surface texture (e.g. protrusions, dimples, grooves, ridges, etc.) with nonstick properties. In one example, the floor 212 may be made in whole or in part from an oxygen-permeable material.

The vat 210, or selected portions of it, are transparent. As used herein, "transparent" refers to a material which allows radiant energy of a selected wavelength to pass through. For example, as described below, the radiant energy used for curing could be ultraviolet light or laser light in the visible spectrum. Nonlimiting examples of transparent materials include polymers, glass, and crystalline minerals such as sapphire or quartz. The vat 210 could be made up of two or more subcomponents, at least some of which are transparent.

Referring again to FIG. 1, the stage 14 is a structure defining a planar upper surface 30 which is capable of being oriented parallel to the build surface 226 during the layer orientation and curing steps described below. Collectively, the vat 210 and the radiant energy apparatus 18 define a "build zone" 31.

Some means are provided for moving the vat 210 relative to the stage 14 parallel to the Z-direction. In FIG. 1, these means are depicted schematically as a simple actuator 32 connected between the stage 14 and a stationary support structure 34, with the understanding devices such as pneumatic cylinders, hydraulic cylinders, ballscrew electric actuators, linear electric actuators, or delta drives may be used for this purpose. In addition to or as an alternative to making the stage 14 movable, the vat 210 could be movable parallel to the Z-direction.

The material depositor 16 may be any device or combination of devices which is operable to introduce a layer of resin R into the receptacle 221. The material depositor 16 may optionally include a device or combination of devices to define a height in the resin and/or to level the resin R. Nonlimiting examples of suitable material deposition devices include chutes, hoppers, pumps, spray nozzles, spray bars, or printheads (e.g. inkjets).

In the example shown in FIG. 1, the material depositor 16 comprises a supply container 36 with a nozzle 38 and a valve 40. Means may be provided for mixing the resin R to ensure the material is homogenous. Appropriate means are provided for moving the material depositor 16 over the build surface 226, such as the actuator 41 seen in FIG. 6, to deposit resin R. Thus a suitable resin R can have a lower viscosity such that it flows easily and is quickly self-leveling. Also, another suitable resin R can have a higher viscosity such that it flows very slowly such that it can effectively maintain a shape with defined boundaries on the build surface 226. In addition, the resin R can be filled.

Means may be provided for leveling the applied resin R. In the example shown in FIG. 1, the material depositor 16 includes a recoater 42 which is laterally-elongated structure configured to be a spreader. This may be rigidly fixed to the supply container 36 or may be connected to a separate actuator (not shown). Optionally, the resin R may be leveled by vibrating the vat 210 or one or more rollers (not shown) may be provided to move and level the resin R. A material depositor incorporated within the stage 14 can be used to introduce resin R into the receptacle 221 of the vat 210. For example, FIG. 1 illustrates a supply container 49 which communicates with a valve 51 and a discharge pipe 53 which extends through an opening in the stage 14.

Figure 11:
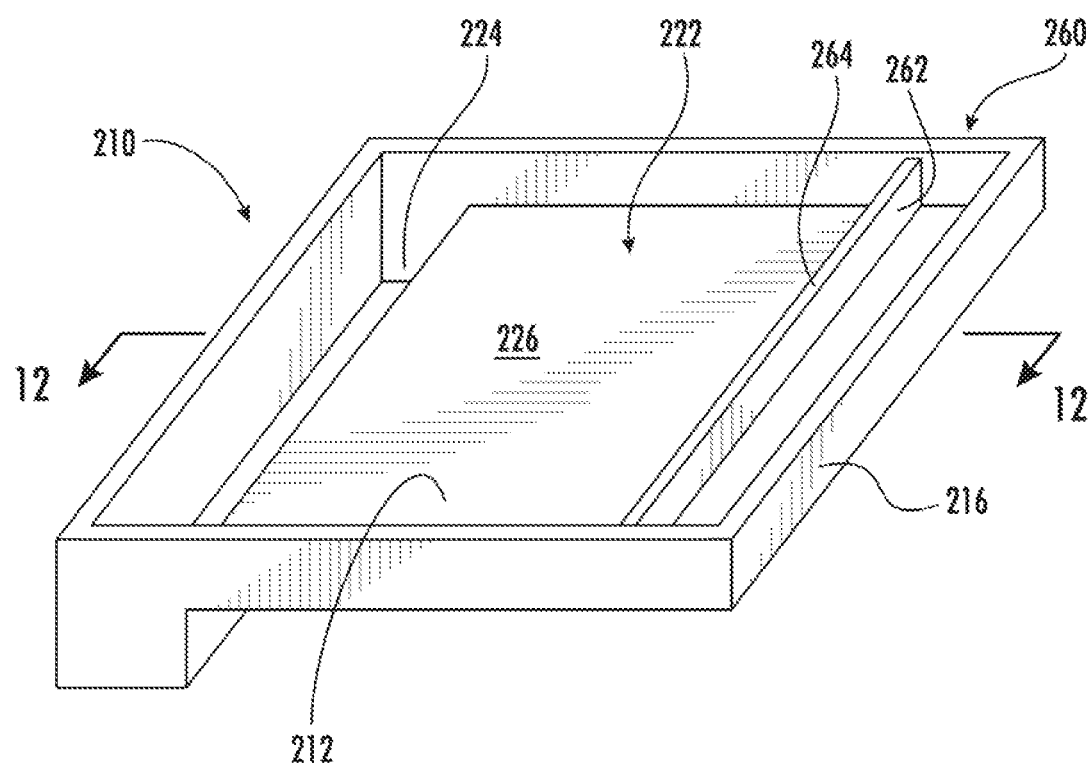
FIG. 11 is a view of a vat.
Figure 12:
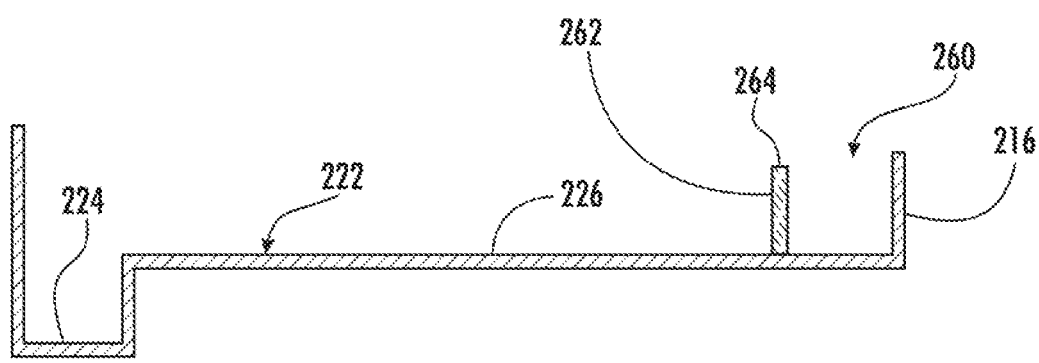
FIG. 12 is a view of the vat of FIG. 11 taken along line 12-12.

Referring now to FIGS. 11 and 12, resin R could be supplied to the receptacle 221 by a material depositor such as a resin supply trough 260 that is integrally formed as part of the vat 210. In this regard, the second sump 225 is defined as a trough 260 by a dividing wall 262 along with at least the second wall 216 and floor 212 as shown in FIG. 11. The dividing wall 262 includes a top edge 264 which can be configured such that radiant-energy-curable resin can flow over the top edge 264 into the first portion 222. Thus when the level of resin in trough 260 is maintained such that it is higher than the top edge 264, the resin R can flow across the build surface 226 and coat it.

Figure 13:
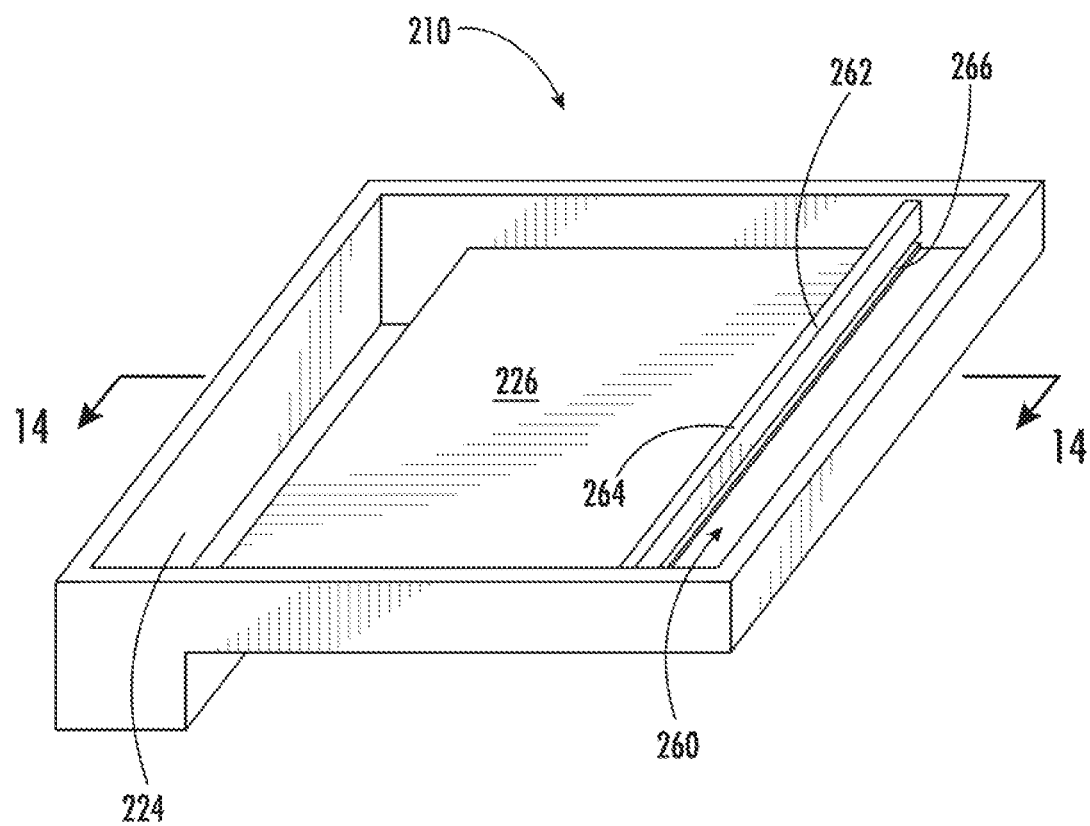
FIG. 13 is a view of a vat.
Figure 14:
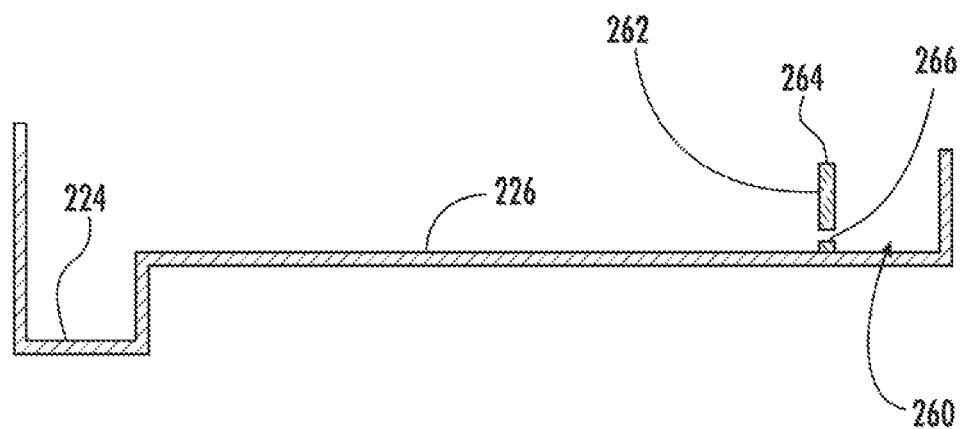
FIG. 14 is a view of the vat of FIG. 13 taken along line 14-14.

As shown in FIGS. 13 and 14, the dividing wall 262 can have an opening such as slot 266 formed therethrough such that the supply trough 260 is fluidly connected to the build surface 226 once engaged with the build surface 226. It should be appreciated that the slot 266 can be in the form of multiple openings and the geometry of slot 266 can vary from generally rectangular to generally circular.

Referring now to the cleaning apparatus 20, it may be any device or combination of devices which is effective to remove uncured resin R and other debris from the build surface 226 and transfer it to the first sump 224 or the second sump 225. Nonlimiting examples of suitable cleaning devices include scrapers, brushes, wipers, suction or blowing mechanisms, absorbent or sponge-like devices, solvent rinsing equipment, or combinations thereof.

In the example shown in FIG. 1, the cleaning apparatus 20 includes a scraper 44 which is a laterally-elongated structure. It is connected to an actuator 46 (shown schematically in FIG. 6) operable to selectively move the scraper 44 vertically to engage and disengage the build surface. The scraper 44 is configured to move laterally over the build surface 226. In this manner the scraper 44 can push debris into one of the sumps 224 or 225.

The radiant energy apparatus 18 may comprise any device or combination of devices operable to generate and project radiant energy on the resin R in a suitable pattern and with a suitable energy level and other operating characteristics to cure the resin R during the build process, described in more detail below.

In one exemplary embodiment as shown in FIG. 1, the radiant energy apparatus 18 may comprise a "projector" 48, used herein generally to refer to any device operable to generate a radiant energy patterned image of suitable energy level and other operating characteristics to cure the resin R. As used herein, the term "patterned image" refers to a projection of radiant energy comprising an array of individual pixels. Nonlimiting examples of patterned imaged devices include a DLP projector or another digital micromirror device, a 2D array of LEDs, a 2D array of lasers, or optically addressed light valves. In the illustrated example, the projector 48 comprises a radiant energy source 50 such as a UV lamp, an image forming apparatus 52 operable to receive a source beam 54 from the radiant energy source 50 and generate a patterned image 56 to be projected onto the surface of the resin R, and optionally focusing optics 58, such as one or more lenses.

The radiant energy source 50 may comprise any device operable to generate a beam of suitable energy level and frequency characteristics to cure the resin R. In the illustrated example, the radiant energy source 50 comprises a UV flash lamp.

The image forming apparatus 52 may include one or more mirrors, prisms, and/or lenses and is provided with suitable actuators, and arranged so that the source beam 54 from the radiant energy source 50 can be transformed into a pixelated image in an X-Y plane coincident with the surface of the resin R. In the illustrated example, the image forming apparatus 10 may be a digital micromirror device. For example, the projector 48 may be a commercially-available Digital Light Processing ("DLP") projector.

As an option, the projector 48 may incorporate additional means such as actuators, mirrors, etc. configured to selectively move the image forming apparatus 52 or other parts of the projector 48, with the effect of rastering or shifting the location of the patterned image 56 on the build surface 226. Stated another way, the patterned image 56 may be moved away from a nominal or starting location. This permits a single image forming apparatus 52 to cover a larger build area, for example. Means for rastering or shifting the patterned image from the image forming apparatus 52 are commercially available. This type of image projection may be referred to herein as a "tiled image".

Figure 2:
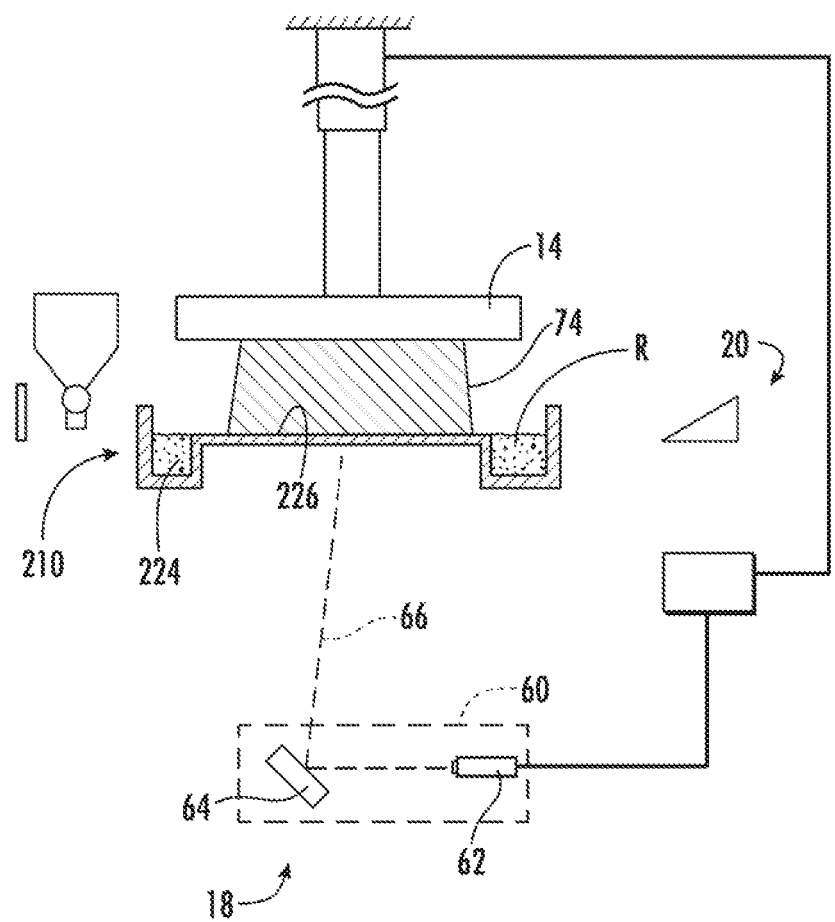
FIG. 2 is a schematic side elevation view of an alternative additive manufacturing apparatus.

In another exemplary embodiment as shown in FIG. 2, the radiant energy apparatus 18 may comprise a "scanned beam apparatus" 60 used herein to refer generally to refer to any device operable to generate a radiant energy beam 66 of suitable energy level and other operating characteristics to cure the resin R and to scan the beam 66 over the surface of the resin R in a desired pattern. In the illustrated example, the scanned beam apparatus 60 comprises a radiant energy source 62 and a beam steering apparatus 64.

The radiant energy source 62 may comprise any device operable to generate a beam of suitable power and other operating characteristics to cure the resin R. Nonlimiting examples of suitable radiant energy sources include lasers or electron beam guns.

The beam steering apparatus 10 may include one or more mirrors, prisms, and/or lenses and may be provided with suitable actuators, and arranged so that the beam 66 from the radiant energy source 62 can be focused to a desired spot size and steered to a desired position in plane coincident with the surface of the resin R. The beam 66 may be referred to herein as a "build beam". Other types of scanned beam apparatus may be used. For example, scanned beam sources using multiple build beams are known, as are scanned beam sources in which the radiant energy source itself is movable by way of one or more actuators.

The apparatus 10 may include a controller 68. The controller 68 in FIG. 1 is a generalized representation of the hardware and software required to control the operation of the apparatus 10, including some or all of the material depositor 16, the stage 14, the radiant energy apparatus 18, the cleaning apparatus 20, and the various actuators described above. The controller 68 may be embodied, for example, by software running on one or more processors embodied in one or more devices such as a programmable logic controller ("PLC") or a microcomputer. Such processors may be coupled to sensors and operating components, for example, through wired or wireless connections. The same processor or processors may be used to retrieve and analyze sensor data, for statistical analysis, and for feedback control.

Optionally, the components of the apparatus 10 may be surrounded by a housing 70, which may be used to provide a shielding or inert gas atmosphere using gas ports 72. Optionally, pressure within the enclosure could be maintained at a desired level greater than or less than atmospheric. Optionally, the enclosure 70 could be temperature and/or humidity controlled. Optionally, ventilation of the enclosure 70 could be controlled based on factors such as a time interval, temperature, humidity, and/or chemical species concentration.

The resin R comprises a material which is radiant-energy curable and which is capable of adhering or binding together the filler (if used) in the cured state. As used herein, the term "radiant-energy curable" refers to any material which solidifies in response to the application of radiant energy of a particular frequency and energy level. For example, the resin R may comprise a known type of photopolymer resin containing photo-initiator compounds functioning to trigger a polymerization reaction, causing the resin to change from a liquid state to a solid state. Alternatively, the resin R may comprise a material which contains a solvent that may be evaporated out by the application of radiant energy.

Generally, the resin R should be flowable so that it can be leveled within the vat 210. A suitable resin R will be a material that is relatively that has a relatively higher viscosity. The composition of the resin R may be selected as desired to suit a particular application. Mixtures of different compositions may be used.

The resin R may be selected to have the ability to out-gas or burn off during further processing, such as the sintering process described above.

If a filler is used, it may be pre-mixed with resin R, then loaded into the material depositor 16. The filler comprises particles, which are conventionally defined as "a very small bit of matter". The filler may comprise any material which is chemically and physically compatible with the selected resin R. The particles may be regular or irregular in shape, may be uniform or non-uniform in size, and may have variable aspect ratios. For example, the particles may take the form of powder, of small spheres or granules, or may be shaped like small rods or fibers.

The composition of the filler, including its chemistry and microstructure, may be selected as desired to suit a particular application. For example, the filler may be metallic, ceramic, polymeric, and/or organic. Other examples of potential fillers include diamond, silicon, and graphite. Mixtures of different compositions may be used.

The filler may be "fusible", meaning it is capable of consolidation into a mass upon via application of sufficient energy. For example, fusibility is a characteristic of many available polymeric, ceramic, glass, and metallic powders.

The proportion of filler to resin R may be selected to suit a particular application. Generally, any amount of filler may be used so long as the combined material is capable of flowing and being leveled, and there is sufficient resin R to hold together the particles of the filler in the cured state.

Examples of the operation of the apparatus 10 will now be described in detail with reference to FIGS. 3-7. It will be understood that, as a precursor to producing a component and using the apparatus 10, the component 74 is software modeled as a stack of planar layers arrayed along the Z-axis. Depending on the type of curing method used, each layer may be divided into a grid of pixels. The actual component 74 may be modeled and/or manufactured as a stack of dozens or hundreds of layers. Suitable software modeling processes are known in the art.

Figure 3:
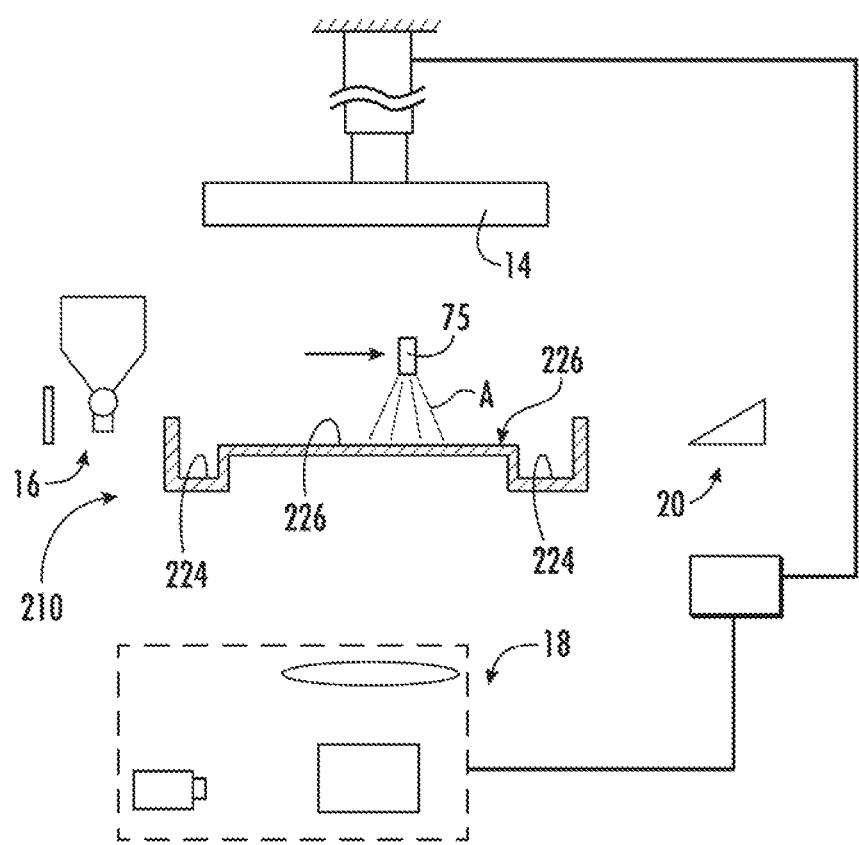
FIG. 3 is a side view of the apparatus of FIG. 1, showing an optional release agent spray head.
Figure 4:
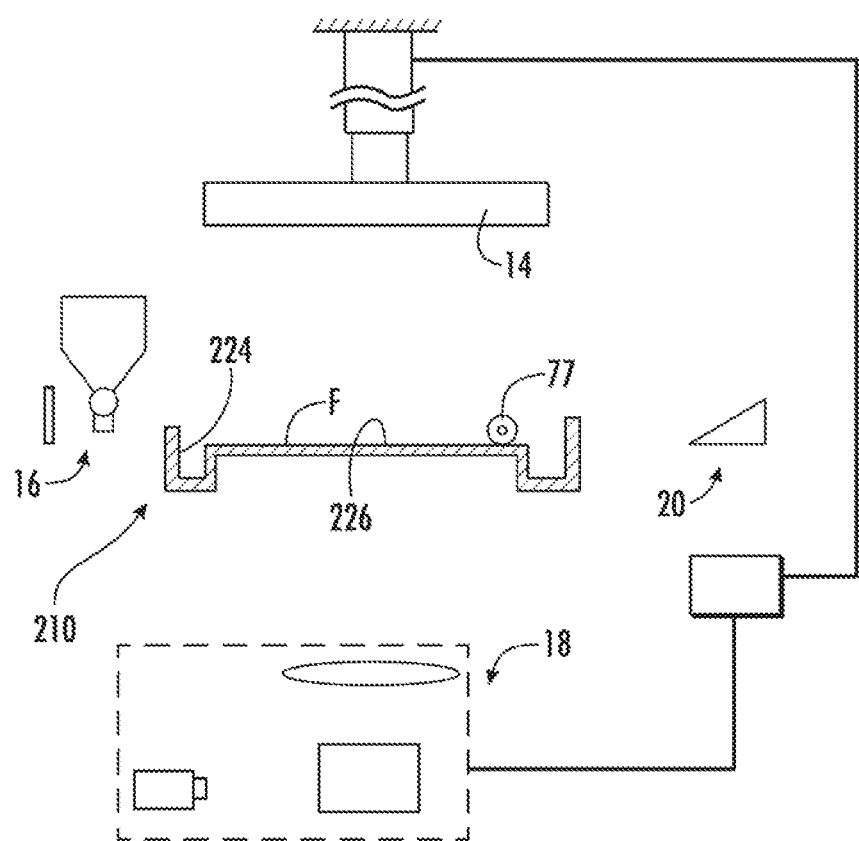
FIG. 4 is a side view of the apparatus of FIG. 1, showing an optional release film applicator.
Figure 5:
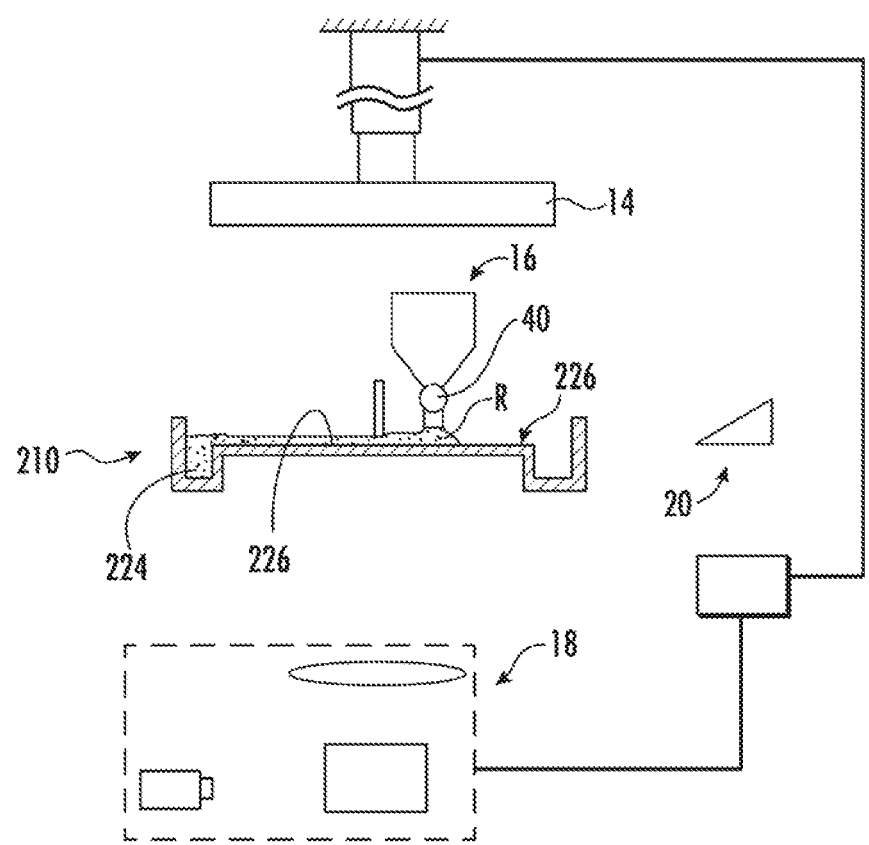
FIG. 5 is a view of the apparatus of FIG. 1, showing resin being deposited into a vat thereof.

Optionally, the build process may begin by applying a nonstick material to the build surface 226 prior to resin application. For example, a release agent such as polyvinyl alcohol ("PVA") may be applied to the build surface 226 prior to each layer being built. FIG. 3 shows a release agent "A" being applied to the build surface 226 by a moving spray nozzle 75. In another example, a sacrificial layer having non-stick properties may be applied. FIG. 4 shows a nonstick film "F" (e.g. polymer sheet or film) being laid down on the build surface 226 by moving roller 77. The film F may be removed after a layer is cured as described below. Optionally, to prevent sticking, some means could be provided to supply oxygen through the thickness of the floor 212 of the vat 210, in order to inhibit curing of the resin R immediately adjacent the build surface 226 (oxygen can inhibit the curing of UV-curable resins).

The material depositor 16 can be used to fill the receptacle 221 of the vat 210 with the curable resin R. In the example shown in FIG. 5, the valve 40 is open and resin flows into the receptacle 221 as the material depositor 16 translates laterally above the vat 210, and the recoater 42 levels the resin R. Optionally, the resin R is allowed to self-level. This filling step is used when beginning a build or when such resin R has been consumed that refilling is required.

Figure 6:
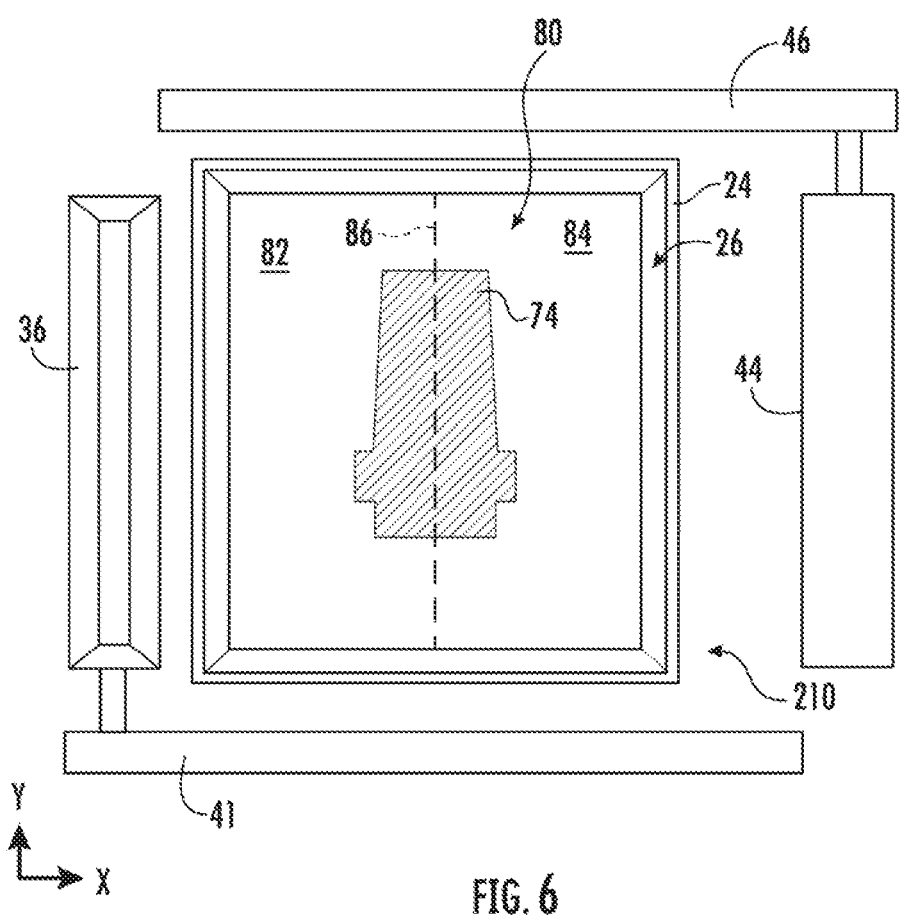
FIG. 6 is a schematic top plan view of a layer of resin having multiple sections being applied in the apparatus of FIG. 1.
Figure 7:
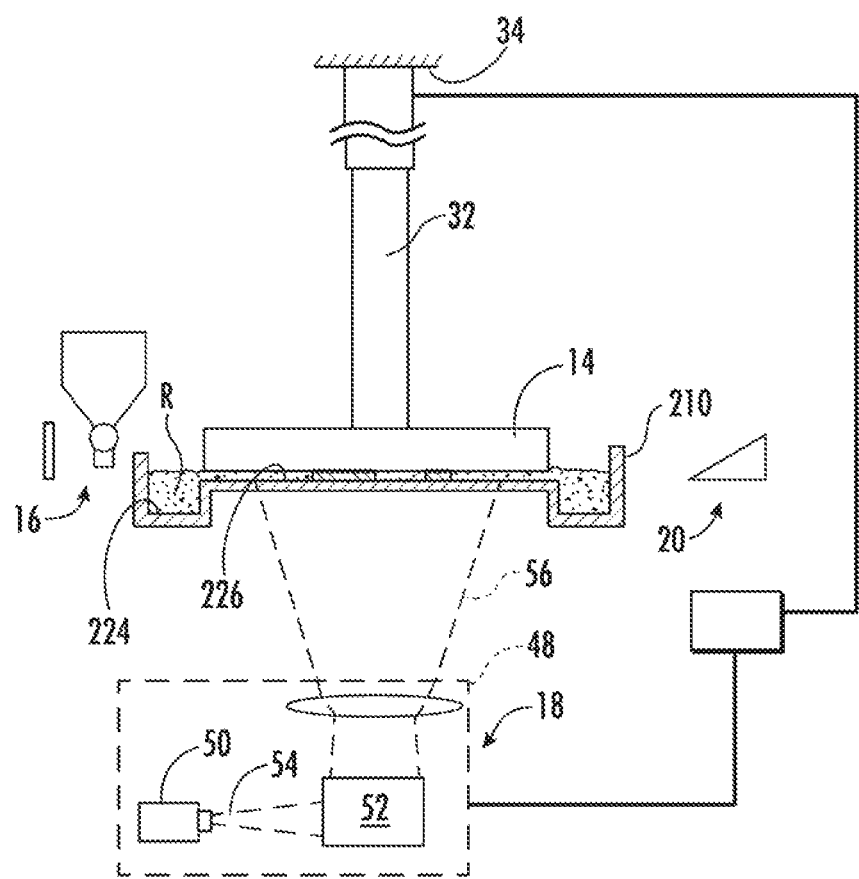
FIG. 7 is a view of the apparatus of FIG. 1, showing a stage lowered into place and resin being cured using a radiant energy apparatus.

Optionally, any of the individual layers may comprise two or more material combinations when the material combinations have a sufficiently high viscosity such that they maintain sufficient separation. FIG. 6 illustrates an exemplary layer 80 showing a cross-section of the component 74 superimposed thereupon. The layer 80 is divided into a first section 82 including a first combination of resin R and filler, and a second section 84 including a second combination of resin R and filler. A dashed line 86 indicates the division between the two sections 82, 84. The shape, size, and number of sections, and number of different material combinations within a given layer may be arbitrarily selected. If multiple material combinations are used in one layer, then the deposition steps described above would be carried out for each section of the layer.

After the material is deposited, or as an integral part of the deposition step, the apparatus 10 is positioned to define a selected layer increment. The layer increment is defined by some combination of the thickness of the resin R that is applied by the material depositor 16 or 116 (including optionally the operation of the recoater 42), or the operation of the stage 14, or some combination thereof. For example, the stage 14 could be positioned such that the upper surface 30 is just touching the applied resin R. Alternatively, the stage 14 could be used as a spreader to displace the resin R to positively define the layer increment. See FIG. 7. The layer increment affects the speed of the additive manufacturing process and the resolution of the component 74. The layer increment can be variable, with a larger layer increment being used to speed the process in portions of a component 74 not requiring high accuracy, and a smaller layer increment being used where higher accuracy is required, at the expense of process speed.

Once the layer increment has been defined, the radiant energy apparatus 18 is used to cure a cross-section or layer of the component 74 being built.

Where a projector 48 is used, the projector 48 projects a patterned image 56 representative of a cross-section of the component 74 through the floor 212 of the vat 210 to the resin R. Exposure to the radiant energy cures and solidifies the pattern in the resin R. This type of curing is referred to herein as "selective" curing. It will be understood that photopolymers undergo degrees of curing. In many cases, the radiant energy apparatus 18 would not fully cure the resin R. Rather, it would partially cure the resin R enough to "gel" and then a post-cure process (described below) would cure the resin R to whatever completeness it can reach. It will also be understood that, when a multi-layer component is made using this type of resin R, the energy output of the radiant energy apparatus 18 may be carefully selected to partially cure or "under-cure" a previous layer, with the expectation that when the subsequent layer is applied, the energy from that next layer will further the curing of the previous layer. In the process described herein, the term "curing" or "cured" may be used to refer to partially-cured or completely-cured resin R. During the curing process, radiant energy may be supplied to a given layer in multiple steps (e.g. multiple flashes) and also may be supplied in multiple different patterns for a given layer. This allows different amounts of energy to be applied to different parts of a layer.

Figure 8:
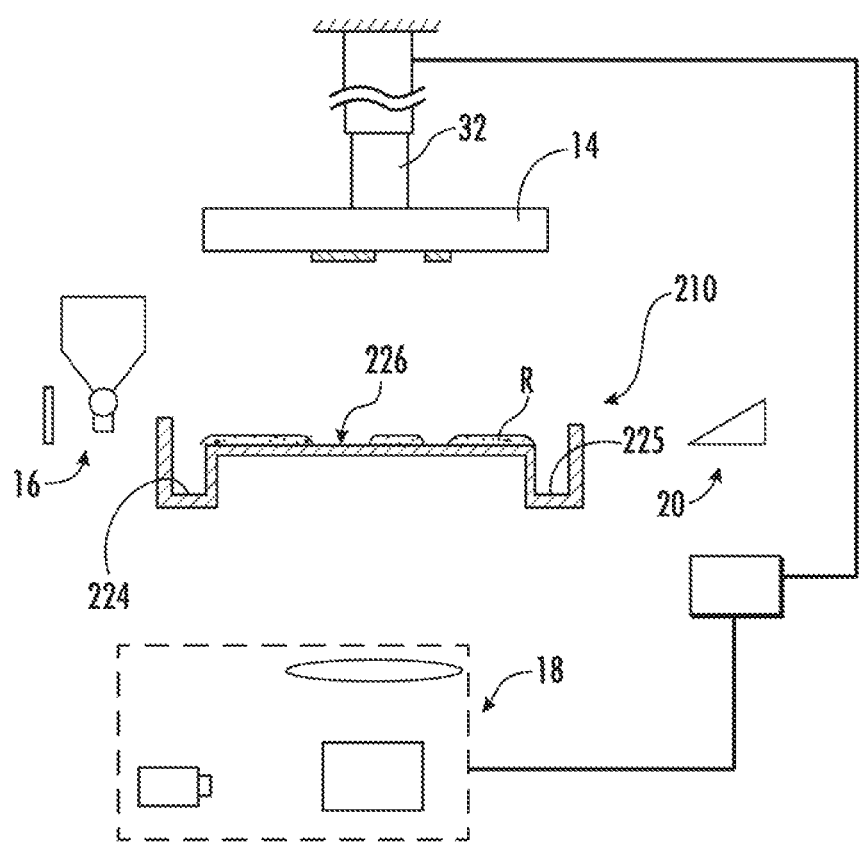
FIG. 8 is a view of the apparatus of FIG. 1, showing a stage retracted.

Once curing of the first layer is complete, the stage 14 is separated from the vat 210, for example by raising the stage 14 using the actuator 32 (FIG. 8). It is noted that stage 14 and the vat 210 do not necessarily have to remain parallel during the separation procedure. For example, the vat 210 could rotate (e.g. using of a pinned joint or a flexure) or through small-scale deformations of the vat 210. This flexing or rotation could be helpful in separating cured resin from the vat 210.

The build surface 226 is then cleaned to remove any excess cured or uncured resin R, filler, release agent, nonstick film F, or other debris. For example, this may be done by moving the scraper 44 described above across the build surface 226, as shown in FIG. 9. Optionally, the vat 210 may be articulated in some way to aid the cleaning process by encouraging debris to slide off. Debris is removed from the build surface 226 and is swept into one of the sumps 224 or 225. It should be appreciated that other embodiments can include more than two build surfaces and more than two sumps.

The scraper 44 can be operated to selectively wipe or sweep predetermined regions. Such an operation is relevant when the layer 80 is divided into a first section 82 and a second section 84 by a dividing line 81 as described above. In this situation, the operation of the scraper 44 would begin at the dividing line 81. From that starting point, material in the first section 82 can be swept into the first sump 224. Likewise material from the second section can be swept into the second sump 225. Thus different resin types that were used on the same layer can be separated for future recycling and reuse.

After using the scraper 44, the build surface can be further cleaned with a solvent. In addition, the scraper 44 can be cleaned with a solvent between uses in order to prevent cross contamination of materials.

The vat 210 need not remain in the build position in during the cleaning process. For example, in a variation, the vat 210 may be moved out of the build zone 31 for resin application, moved into the build zone for curing, and then moved out of the build zone 31 for cleaning and resin re-application in subsequent steps. A conventional device such as a manipulator arm or conveyor belt (not shown) could be used to move the vat 210 for this purpose. It will be understood that in this variation the material depositor 16 and the cleaning apparatus 20 would be positioned outside of the build zone 31. Conventional alignment means (pins, guides, etc.—not shown) may be provided to ensure repeatable positioning of the vat 210 within the build zone and/or in a loading or cleaning area outside of the build zone.

During operations where the receptacle 221 is filled with a lower viscosity resin R, the resin R can flow back over the build surface 226 as the build surface 226 is wiped free of debris. For operations where only sufficient resin R is available to cover the build surface 226 (such as when very little resin R is used or resin R has a viscosity such that it does not flow or self-level), another layer increment is defined as described above after the build surface is wiped free of debris. The projector 48 again projects a patterned image 56. Exposure to the radiant energy selectively cures resin R as described above, and joins the new layer to the previously-cured layer above. This cycle of applying resin R, incrementing a layer, and then selectively curing is repeated until the entire component 74 is complete.

Where a scanned beam apparatus is used instead of a projector, the radiant energy source 68 emits a beam 66 and the beam steering apparatus 70 is used to cure the resin R by steering a focal spot of the build beam 66 over the exposed resin R in an appropriate pattern. The cycle of cleaning, applying resin R, and defining a layer increment is repeated. The radiant energy source 68 again emits a build beam 66 and the beam steering apparatus 70 is used to steer the focal spot of the build beam 66 over the exposed resin R in an appropriate pattern. The exposed layer of the resin R is exposed to the radiant energy which selectively cures resin R as described above, and joins it to the previously-cured layer above. This cycle of incrementing a layer, applying resin R, and then selectively curing is repeated until the entire workpiece 74 is complete.

Optionally, a scanned beam apparatus may be used in combination with a projector. For example, a scanned beam apparatus may be used to apply radiant energy (in addition to that applied by the projector) by scanning one or multiple beams over the surface of the exposed particulate material P. This may be concurrent or sequential with the use of the projector.

The accuracy of either process, defined as the smallest component feature size which can be produced, is limited mainly by the particle size of the filler and the resolution of the projector 48 or scanned beam apparatus 60.

Any of the curing methods described above results in a component 74 in which the filler (if used) is held in a solid shape by the cured resin R. This component may be usable as an end product for some conditions. Subsequent to the curing step, the component 74 may be removed from the stage 14.

If the end product is intended to be composed of the filler (e.g. to be purely ceramic, glass, metallic, diamond, silicon, graphite, etc., the component 74 may be treated to a conventional sintering process to burn out the resin R and to consolidate the remaining particles. Optionally, a known infiltration process may be carried out during or after the sintering process, in order to fill voids in the component with a material having a lower melting temperature than the filler. The infiltration process improves component physical properties.

Figure 15:
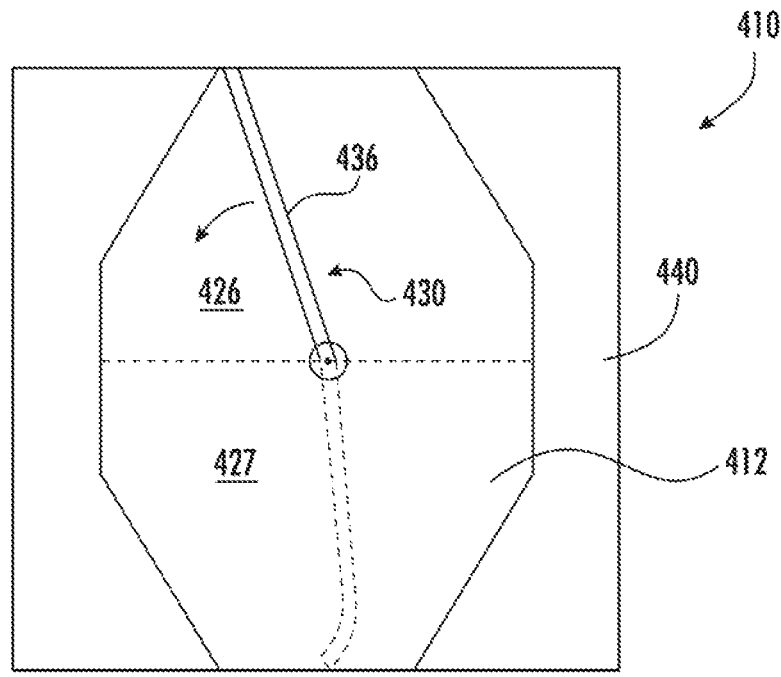
FIG. 15 is a view of an alternative vat.
Figure 16:
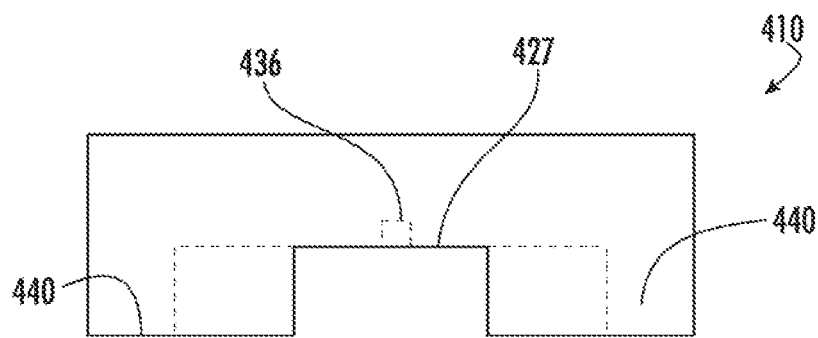
FIG. 16 is a view of the vat of FIG. 15 taken along line 16-16.

An alternative embodiment of a vat is shown in FIGS. 15 and 16. Parts shown in FIGS. 15 and 16 that are referenced by 400 series numbers can be generally understood from the description of parts in the 0 and 100 series described above. A first build surface 426 and a second build surface 427 are defined by the floor 412 of the vat 410. The vat 410 also includes two sumps 440. Each of the sumps 440 include a sump floor 444 and an interior wall 442 that define a sump chamber 446. The vat 410 includes a wiper 430 that includes an arm 436 that is mounted generally near the center of the sump floor 444 at the boundary of the first and second build surfaces 426 and 427.

The wiper 430 is configured to rotate such that the arm 436 defines a clean region around the wiper 430. In this manner, the arm 436 of the wiper 430 moves radially over the build surface 426. The arm 436 is flexible such that it can extend over the build surfaces 426 and 427 as shown in dashed lines in FIG. 15. Additionally, the build surfaces 426 and 427 and the sumps 440 are configured to eliminate dead areas or regions that are not cleanable by the wiper 430. It should be appreciated that the resin R over the first build surface 426 can be cured while the wiper 430 is sweeping debris from the second build surface 427 in preparation for an upcoming curing cycle. Likewise, the resin R over the second build surface 427 can be cured while the wiper 430 is sweeping debris from the first build surface 426 in preparation of an upcoming curing cycle.

Figure 17:
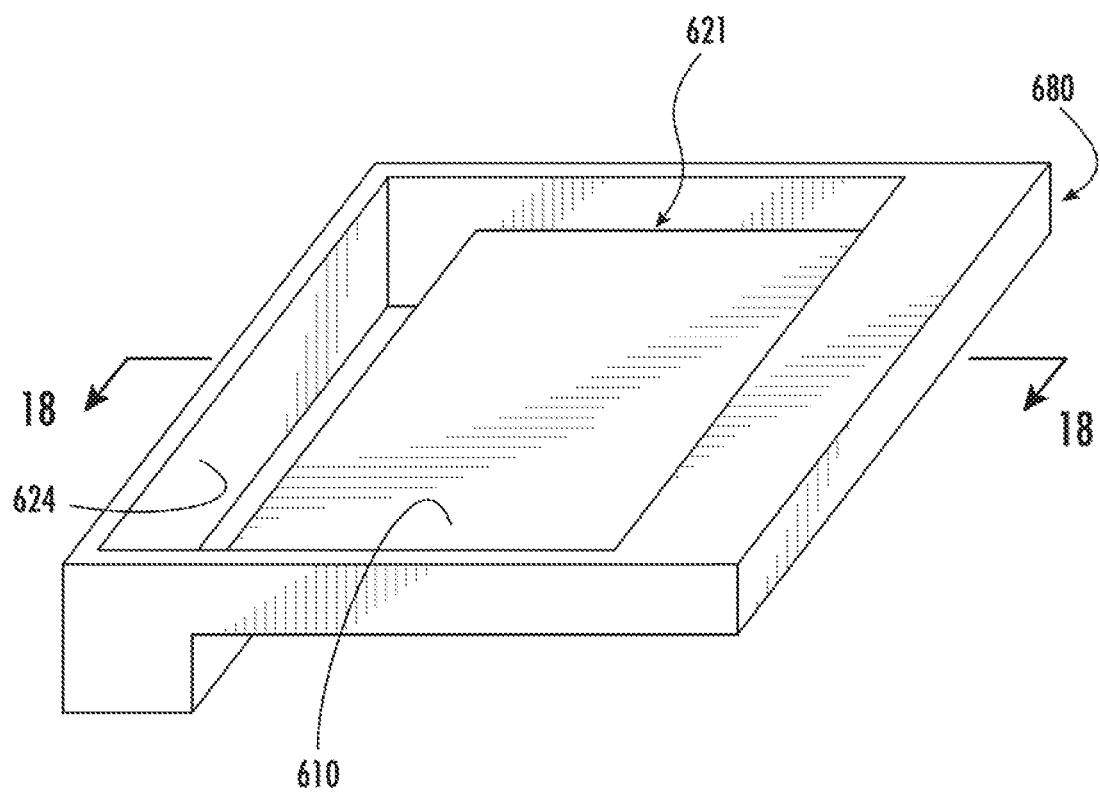
FIG. 17 is a view of an alternative vat.
Figure 18:
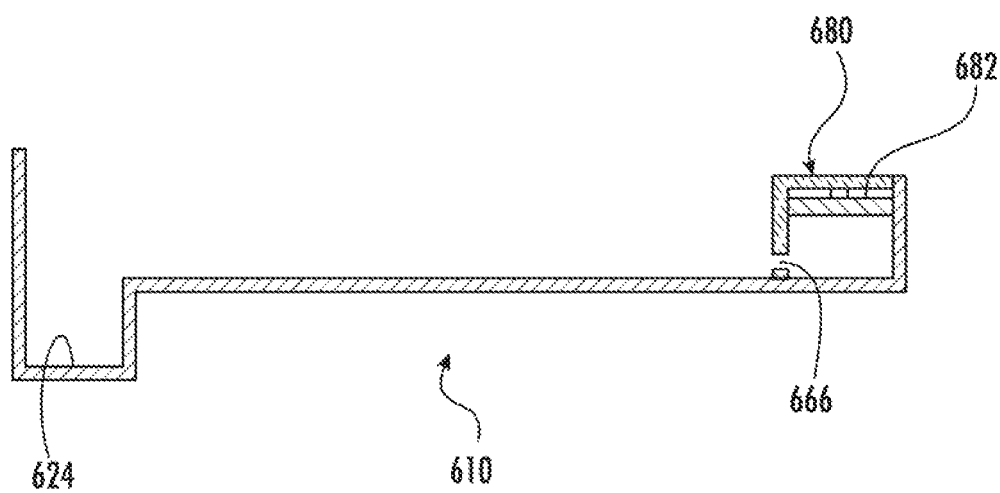
FIG. 18 is a view of the vat of FIG. 17 taken along line 18-18.

Referring now to FIGS. 17 and 18, there is shown an alternative embodiment vat 610 that is similar to the vat 210. Elements indicated by reference numbers in the 600 series can be understood from the description above of elements associated with similar reference numbers in the 200 series. The vat 610 includes a receptacle 621 and a sump 624. An enclosed supply chamber 680 is fluidly connected to the receptacle 621 via an opening 666. The supply chamber 680 is configured to be pressurized relative to a receptacle 621. Such pressurization could be achieved by a movable wall or piston 682 associated with the chamber 680 and configured to move between a first position and a second position such that the pressure of the resin is increased. In this manner, resin R can be forced from the supply chamber 680 into the receptacle 621.

Figure 19:
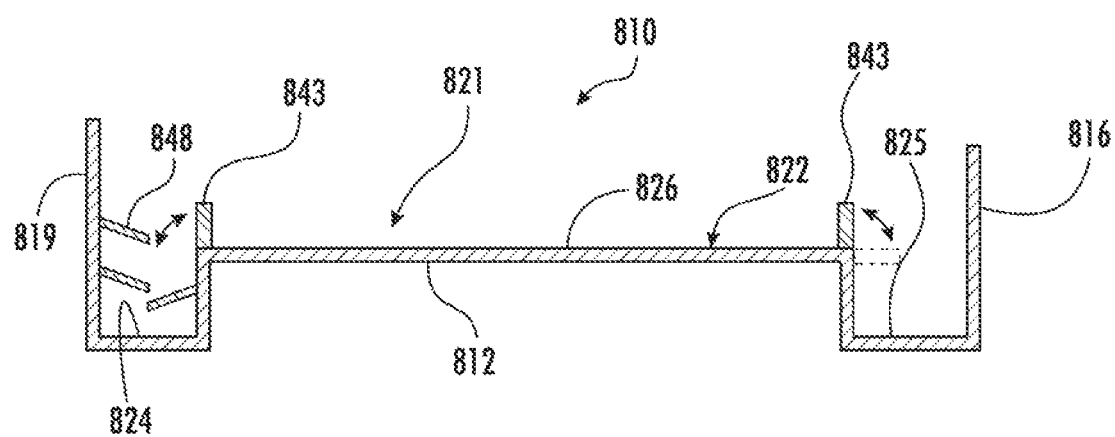
FIG. 19 is a sectional view of an alternative vat that includes sub-walls.

Referring now to FIG. 19, there is shown an alternative embodiment vat 810 that is similar to the vat 210 and includes at least one movable subwall 843 described further below. Elements indicated by reference numbers in the 800 series can be understood from the description above of elements associated with similar reference numbers in the 200 series. The vat 810 includes a floor 812 that extends between a second wall 816, and a fourth wall 819. Together, the floor 812 and the four walls 814 (not shown), 816, 818 (not shown), and 819 define a receptacle 821 for receiving the radiant-energy-curable resin. The receptacle 821 is open such that it can receive the stage 14 or a portion of the component 74.

The receptacle 821 includes three areas that can contain the resin R: a first portion 822 that is defined in part by a build surface 826; a first sump 824, and a second sump 825. The first sump 824 and the second sump 825 are positioned such that they are lower than the first portion 822.

As shown in FIG. 10, a plurality of baffles 848 are positioned in the first sump 824. The baffles 848 extend into the sump 824 and are positioned such that a distal end is closer to the floor than a basal end (which is attached to a wall). The baffles 848 are configured such that debris swept from the build surface 826 is directed into the sump and trapped in the sump 824.

The subwalls 843 are movable between a first position and a second position. When in the first position, the subwalls 843 define a containment area 821. The containment area 821 is configured to contain resin R on the build surface 826. When in the second position, the subwalls are positioned such that they do not obscured a path between the build surface 826 and the sumps 824 and 825. Thus operation of scraper 44 is not impeded during the cleaning step.

It should be appreciated that the subwalls 843 provide for containment of a small amount of low viscosity resin on the build surface 826 when they are in the first position. When they are in the second position the subwalls 843 can operate as baffles and resin R can freely flow into the sumps 824 and 825. In other embodiments, the subwalls 843 are configured to be moved vertically from the first position as opposed to rotating from the first position as shown in FIG. 19.

The method described herein has several advantages over the prior art. In particular, it eliminates a major pathway for build failures in vat-based photopolymerization. It also potentially has lower cost, less material waste, and higher process speed compared to prior art tape casting methods.

The foregoing has described a method and apparatus for additive manufacturing. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method for producing a component layer-by-layer, comprising the steps of:
depositing a radiant-energy-curable resin on a build surface of a vat which includes at least a portion which is transparent;
defining a layer increment in the radiant-energy-curable resin;
selectively curing the radiant-energy-curable resin while the vat is positioned in a build zone defined between the stage and a radiant energy apparatus, using an application of radiant energy, from the radiant energy apparatus, in a specific pattern so as to define the geometry of a cross-sectional layer of the component;
moving the vat and the stage relatively apart so as to separate the component from the build surface;
using a cleaning apparatus to remove the debris that remains over the build surface and move it into a sump;
trapping the debris moved from the build surface in the sump, the debris being trapped by a baffle; and
repeating the steps of depositing, defining, curing, moving, and cleaning for a plurality of layers until the component is complete.

2. The method of claim 1 wherein the radiant-energy-curable resin includes a particulate material filler.

3. A method for producing a component layer-by-layer, comprising the steps of:
depositing a radiant-energy-curable resin from a supply trough on a build surface of a vat which includes at least a portion which is transparent, the supply trough being separated from the build surface by a dividing wall;
defining a layer increment in the radiant-energy-curable resin;
selectively curing the radiant-energy-curable resin while the vat is positioned in a build zone defined between the stage and a radiant energy apparatus, using an application of radiant energy, from the radiant energy apparatus, in a specific pattern so as to define the geometry of a cross-sectional layer of the component;
moving the vat and the stage relatively apart so as to separate the component from the build surface;
using a cleaning apparatus to remove the debris that remains over the build surface and move it into a sump; and
repeating the steps of depositing, defining, curing, moving, and cleaning for a plurality of layers until the component is complete.

4. The method of claim 3 further comprising the step of flowing the curable resin over the dividing wall.

5. A method for producing a component layer-by-layer, comprising the steps of:
depositing a radiant-energy-curable resin from a pressurized chamber on a build surface of a vat which includes at least a portion which is transparent, the pressurized chamber being separated from the build surface by a dividing wall;
defining a layer increment in the radiant-energy-curable resin;
selectively curing the radiant-energy-curable resin while the vat is positioned in a build zone defined between the stage and a radiant energy apparatus, using an application of radiant energy, from the radiant energy apparatus, in a specific pattern so as to define the geometry of a cross-sectional layer of the component;
moving the vat and the stage relatively apart so as to separate the component from the build surface;
using a cleaning apparatus to remove the debris that remains over the build surface and move it into a sump; and
repeating the steps of depositing, defining, curing, moving, and cleaning for a plurality of layers until the component is complete.

* * * * *